L. RENAULT.
SHOCK ABSORBER FOR VEHICLES.
APPLICATION FILED APR. 2, 1906.

907,644.

Patented Dec. 22, 1908.

3 SHEETS—SHEET 1.

Witnesses,

Inventor
Louis Renault
By
James L. Norris
Atty

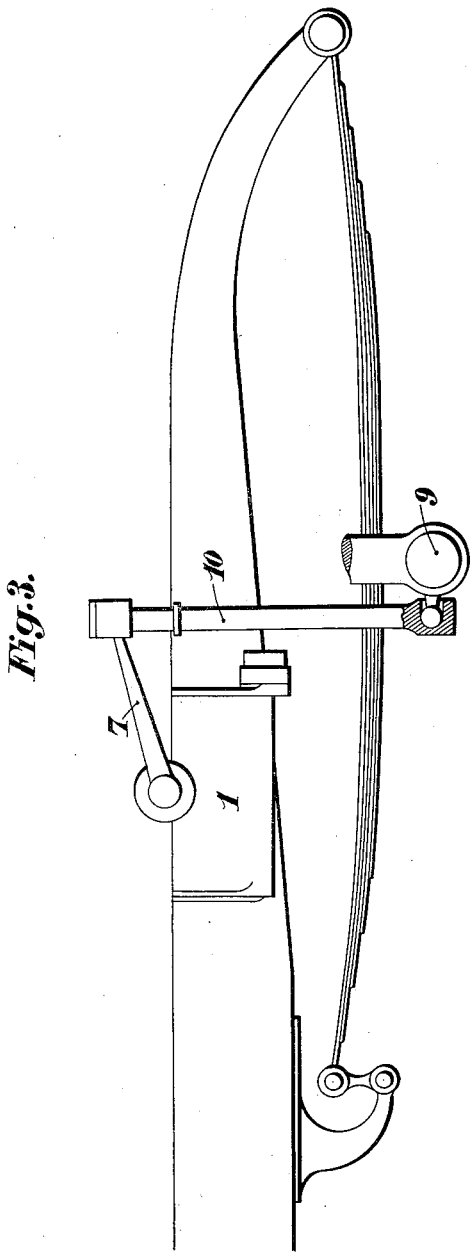

L. RENAULT.
SHOCK ABSORBER FOR VEHICLES.
APPLICATION FILED APR. 2, 1906.
907,644.
Patented Dec. 22, 1908.
3 SHEETS—SHEET 3.
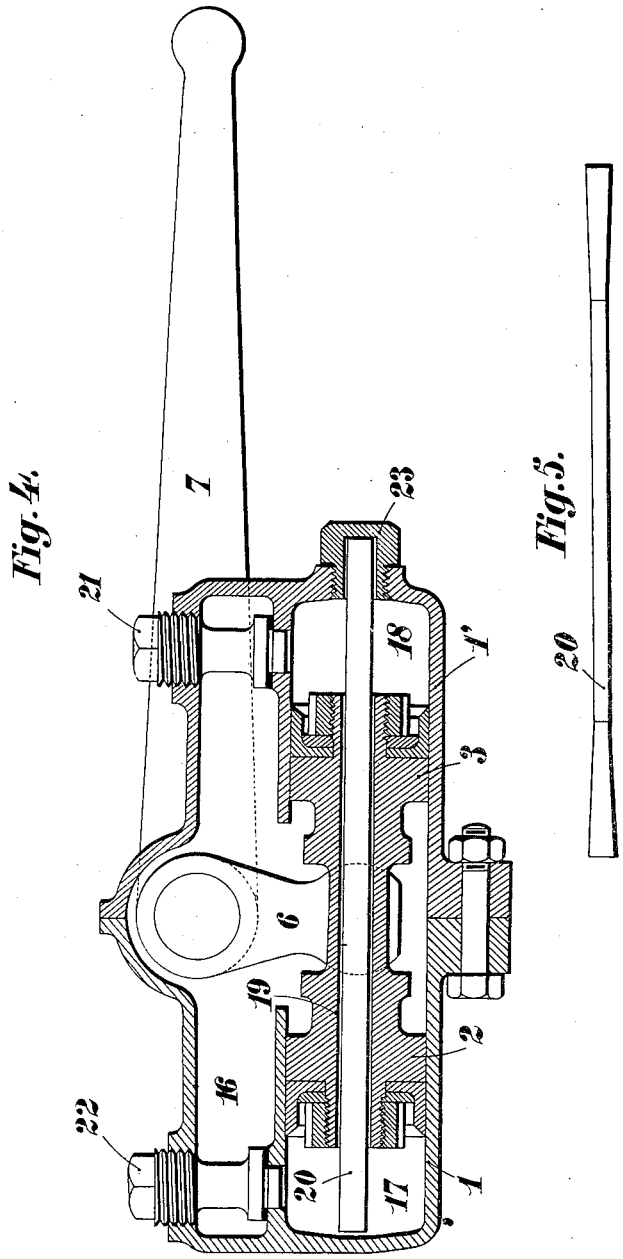
Witnesses
Inventor
Louis Renault
By
James L. Norris
Atty.

UNITED STATES PATENT OFFICE.

LOUIS RENAULT, OF BILLANCOURT, FRANCE.

SHOCK-ABSORBER FOR VEHICLES.

No. 907,644.　　　　Specification of Letters Patent.　　　Patented Dec. 22, 1908.

Application filed April 2, 1906. Serial No. 309,514.

*To all whom it may concern:*

Be it known that I, LOUIS RENAULT, engineer, citizen of the French Republic, residing at Billancourt, Department of Seine, France, have invented certain new and useful Improvements in Buffers or Shock-Absorbers for Vehicles, of which the following is a specification.

This invention relates to a buffer or shock absorber for the suspension of motor or other vehicles of the kind in which a piston connected to the axle by a lever and connecting rods moves in a cylinder filled with a liquid, the two extremities of the cylinder containing liquid communicating one with the other by a passage adapted to be more or less closed by means of a pin cock. A feature of buffers or shock absorbers of this kind is that their piston is wholly surrounded with liquid which renders the use of a stuffing box unnecessary and at the same time prevents any leakage of the liquid to the exterior; in point of fact any leakage, which might occur between the piston and the wall, itself tends to fill the opposite chamber without exerting any pressure of the liquid upon the parts in communication with the atmosphere.

The invention has for its object the construction of a device of the character set forth wherein the absolute filling of the two end chambers of the buffer or shock absorber is insured to prevent a partial vacuum which is produced in the buffers or shock absorbers of this kind, already known where too heavy suction is produced.

Figure 1:
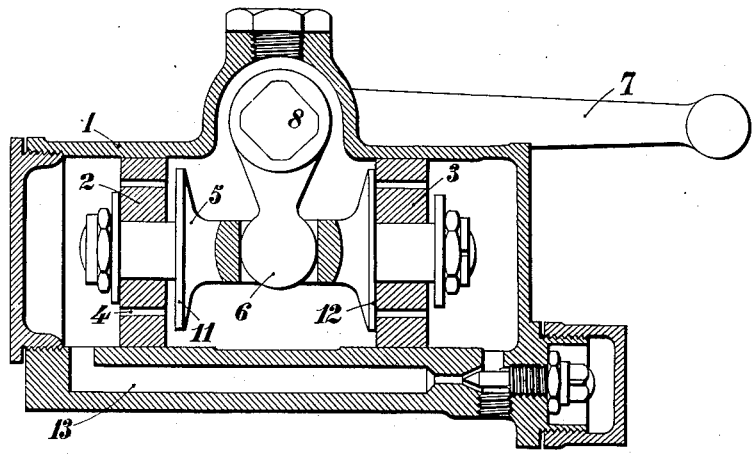
Figure 2:
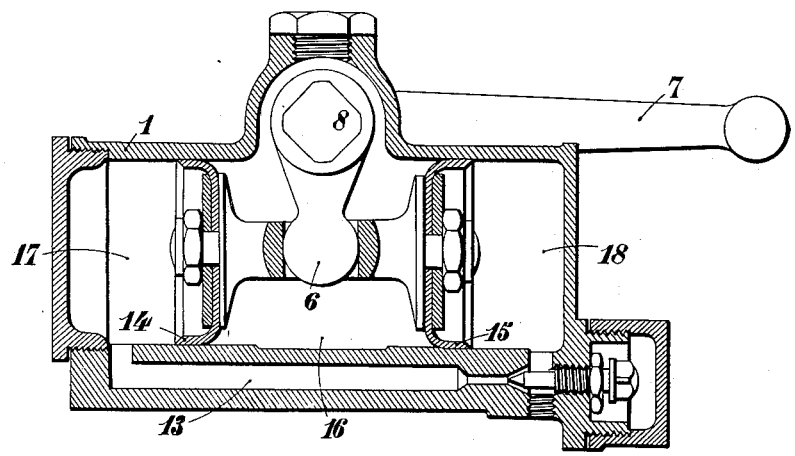

In the accompanying drawings, Figure 1 is a longitudinal section of an apparatus according to the invention. Fig. 2 is a longitudinal section of a modification. Fig. 3 is a diagrammatic view showing the connection between the apparatus and the frame of a motor vehicle. Fig. 4 is a longitudinal section of a further modification. Fig. 5 is a view of a modified part of Fig. 4.

The buffer or shock absorber comprises two pistons 2, 3 (Fig. 1) moving in a cylinder 1 fixed to the frame of the vehicle. These pistons are provided with openings 4 and are connected together by a rod 5 which may be moved longitudinally in one direction or in the other, by means of the shocks received by the axle through the medium of a suitable gearing, for instance by levers 6 and 7 fixed on the same shaft 8. The lever 7 is connected by any suitable means to the axle 9, for instance by a connecting rod 10 (Fig. 3).

The rod 5 connecting the two pistons carries two plates 11, 12 which are adapted to close the openings of one of the pistons or of the other.

The apparatus works as follows: The apparatus being completely filled with a liquid, any strain exerted on the lever 7 is transmitted to one of the pistons or to the other by means of the lever 6 and the rod 5. One of the plates 11 or 12 immediately bears against the openings of the corresponding piston in consequence of the small relative displacement of the rod 5 with respect to the pistons. The liquid compressed in one of the end chambers tends to escape, and passes through the passage 13 provided with a pin cock. But it is obvious that, inasmuch as the piston is not perfectly tight, a certain amount of liquid will pass between the piston and the cylinder. This liquid will be immediately sucked up by the other piston and will penetrate in the other end chamber of the cylinder through the openings of the said piston. In all circumstances the absolute filling of the end chambers is thus insured, and a partial vacuum produced by a too sudden suction is prevented.

In the apparatus shown by Fig. 2 the plates 11 and 12 and the openings 4 in the pistons are dispensed with, and the pistons in this instance are provided with leather valve cups. The leather valve cups 14, 15 of the pistons are so arranged that the liquid may easily pass from the central part or intermediate chamber 16 of the apparatus to the end chambers 17, 18 and contrariwise the liquid which is in the end chambers can not pass again in the central part 16.

In the modification shown on Fig. 4, in order to facilitate manufacture, the body of the shock absorbing device is made in two parts 1 1' which are approximately similar and which are secured together by means of bolts which are exactly centered relatively one to the other. The two pistons 2 and 3 which are in juxtaposition, receive their movement, as hereinbefore explained by means of a system of levers 6, 7. A novel feature of this embodiment of the invention is that the pistons 2 and 3 have a longitudinal cylindrical passage 19 in which is mounted a rod 20 fixed by a nut 23 at one end of the casing leaving a certain amount of play between it and the walls of the said passage 19. This annular space permits of the passage of the liquid contained in the apparatus from the chamber at one end of the piston to the chamber at the other end in either direction. In this form of the apparatus the capacity of the central part or chamber 16 is greater than the capacity of the corresponding parts or chambers shown by Figs. 1 and 2 in order that the end chambers 17, 18 may always be completely filled. Screw plugs 21, 22 are provided for the purpose of filling these chambers.

The operation is as follows: The apparatus being completely filled with liquid, any effort exerted upon the lever 7 is transmitted to the double piston by the lever connecting it with the external lever; the liquid in the chamber at one end 17 or 18 being thereby compressed tends to escape and passing through the annular space 19 in the center of the piston proceeds directly into the chamber, at the other end 18 or 17. The rod 20 passing through the center of the piston is cylindrical but it may be conical at its two extremities as shown on Fig. 5 thus causing the resistance of the shock absorbing device to vary at the two ends of the travel of the double piston. The rod may also be cylindrical with one conical extremity, or it may be entirely conical for braking in one direction. Obviously the resistance of the shock absorbing device depends upon the size of the annular space between the rod and the bore of the piston; this resistance is therefore modified by altering the rod. A set of rods of different diameter may be employed, it being easy to interchange them, since in order to do so it is only necessary to unscrew the nut 23, remove the rod and replace it with another of larger or smaller diameter. Any dismounting or regulation of the apparatus is thus avoided.

It is evident that instead of the valve cups shown in Fig. 4 leather valve cups similar to those shown in Fig. 2 may be used.

Having thus described and ascertained the nature of my invention and in what manner the same may be performed, I declare that what I claim is:

1. In a shock absorber of the class described, a fluid receiving cylinder, an element forming opposite pistons for dividing the cylinder into three compartments and movable therein throughout the longitudinal extent of the same, means connecting these compartments, one with another, one compartment being intermediate the opposing pistons and the others beyond the same, and means associated with an axle of a vehicle and with said element to move the latter.

2. In a shock absorber of the class described, a cylinder having means for admitting a fluid thereto, means independent of the cylinder and movable within the same, and being adapted to divide said cylinder into three compartments, said means having ports forming communication between each compartment, and an oscillatory element having connection with an axle of a vehicle and associated with the movable means to actuate the same.

3. A shock absorber of the class described having a fluid receiving cylinder, a movable member within said cylinder and free of the latter, said member having piston heads for dividing the cylinder into three compartments, levers associated with the said movable member and with an axle of a vehicle, and adapted to actuate the said member on the movement of the axle, a passage connecting the outer of said three compartments and manually operable means for regulating the amount of fluid passing through said passage.

4. A shock absorber of the class described having a fluid receiving cylinder, a movable element within the cylinder, and free to move throughout the longitudinal extent of the same, piston heads carried by said element, the latter being spaced from each other to divide the cylinder into three compartments, mean associated with the piston heads and element for transferring the fluid from one compartment to the other, a lever connected with said movable element between said piston heads, a second lever operatively connected with the first lever and also adapted for connection with an axle, a passage connecting the outer of said three compartments and a valve for regulating the amount of fluid through said passage.

In testimony whereof I have hereunto set my hand in presence of two subscribing witnesses.

LOUIS RENAULT.

Witnesses:
PIERRE L. LEISSE,
EMILE KLOTZ.